United States Patent [19]

Takahashi et al.

[11] Patent Number: 5,537,748
[45] Date of Patent: Jul. 23, 1996

[54] COVER STRUCTURE FOR ELECTRIC CIRCULAR SAW

[75] Inventors: Shoji Takahashi; Kunio Tsugami; Tatsuya Wada, all of Chiyoda-ku, Japan

[73] Assignee: Ryobi Limited, Tokyo, Japan

[21] Appl. No.: 62,989

[22] Filed: May 18, 1993

Related U.S. Application Data

[63] Continuation of Ser. No. 909,955, Jul. 7, 1992, abandoned.

[30] Foreign Application Priority Data

| Sep. 7, 1991 | [JP] | Japan | 3-052893 |
| Sep. 7, 1991 | [JP] | Japan | 3-052894 |
| Nov. 7, 1991 | [JP] | Japan | 3-053788 |
| Nov. 7, 1991 | [JP] | Japan | 3-053789 |

[51] Int. Cl.$^6$ .................................................. B23D 45/16
[52] U.S. Cl. ................................ 30/124; 30/391; 30/390; 83/100
[58] Field of Search ........................... 30/124, 390, 391, 30/388, 286; 83/478, 100

[56] References Cited

U.S. PATENT DOCUMENTS

| 2,589,309 | 3/1952 | Tompkins | 83/478 |
| 3,721,141 | 3/1973 | Frostad | 30/391 |
| 3,922,785 | 12/1975 | Fushiya | 30/391 |
| 4,063,478 | 12/1977 | Stuy | 83/100 |
| 4,192,104 | 3/1980 | Patenaude | 83/100 |
| 4,253,362 | 3/1981 | Olson | 83/100 |
| 4,614,140 | 9/1986 | Macksoud | 83/478 |
| 4,675,999 | 6/1987 | Ito et al. | 30/124 |
| 4,693,008 | 9/1987 | Velie | 30/391 |
| 5,084,972 | 3/1992 | Waugh | 30/391 |
| 5,327,649 | 7/1994 | Skinner | 30/390 |

FOREIGN PATENT DOCUMENTS

0568828  11/1975  Switzerland ........................ 30/391

*Primary Examiner*—Rinaldi I. Rada
*Assistant Examiner*—Allan M. Schrock
*Attorney, Agent, or Firm*—Brooks & Kushman

[57] ABSTRACT

A cut waste discharging device for a circular saw blade of an electric power circular saw machine, which includes: a safety cover for covering an upper portion of the circular saw blade; a lower guard which is angularly movable into the safety cover in accordance with development of a cutting operation of a workpiece with the circular saw blade; and a partition wall provided along an inner peripheral wall of the safety cover so as not to interfere with the lower guard, thereby defining a passage of cut waste with the outer wall of the partition wall and the inner peripheral wall of the safety cover. With such an arrangement, the passage between the outer wall of the partition and the inner wall of the safety cover causes the cut waste, generated in the waste generating portion, to be led to a predetermined discharge place. Accordingly, the waste would not be splash within the safety cover and would not be splashed out of the predetermined discharge place.

4 Claims, 16 Drawing Sheets

COVER STRUCTURE FOR ELECTRIC CIRCULAR SAW

This is a continuation of application Ser. No. 07/909,955 filed on Jul. 7, 1992, now abandoned.

BACKGROUND OF THE INVENTION

The present invention relates to a cover structure for a circular saw blade of an electric power circular saw. Also, it relates to a cut waste or debris discharging device for a circular saw.

A conventional cover for an electric power circular saw is shown in FIG. 20. Namely, the cover structure includes a safety cover 2 for covering an upper portion of a circular saw blade 1, a lower guard 3 that is angularly movable into the safety cover 2 in accordance with the advancement of cutting operation of a workpiece by the circular saw 1 and a front cover 4 having a substantially U-shaped cross section covering a waste generating portion at the front portion of the circular saw blade 1.

With such a structure, the cut waste or debris generated by cutting the workpiece A with the circular saw blade 1 is led to a discharge port 5 to thereby prevent the waste from being splashed to the outside.

However, such a conventional cover structure suffers from a problem that the waste would also flow in directions indicated by arrows a in FIG. 20 when the waste flows from a front portion to a rear portion of the safety cover 2 within a flow path within the safety cover 2. The waste which flows in the direction indicated by the arrows a will splash through parts except for the discharge port of the safety cover 2 and would not be collected to a desired portion.

Also, at the front portion of the safety cover 2, there is a gap 7 between a reference plate 6 (or the workpiece A) and a front cover 4. Accordingly, the conventional structure also suffers from such a problem that a part of the waste generated at the cutting portion would flow in the directions indicated by the arrows b. Also, a part of the waste would enter into the interior of the lower guard 3 which has been advanced toward the front cover 4 through the safety cover 2 in accordance with the development of the cutting work.

FIG. 21 shows a conventional cut waste discharging device. More specifically, a guide wall 13 for guiding cutting debris or waste is provided in an interior of a safety cover 2 for covering a cutting saw blade 1. A discharge outlet 14 is provided at a side wall of the safety cover 2 for discharging the waste which has been guided by the guide wall 13. The waste generated in the cutting portion is discharged to the outside from the discharge outlet 14 while flowing in directions indicated by a number of arrows c and being guided by the guide wall 13.

However, with such a structure of the conventional waste discharging device, there is a fear that the cut waste would fall within the safety cover 2 or would be entrained by the rotation of the cutting saw blade 1 while falling within the safety cover 2 without directing to the discharge outlet 14. For this reason, a large amount of waste is splashed until the waste reaches the discharge outlet 14. Accordingly, the amount of waste collected through the discharge outlet 14 is reduced by these phenomena.

SUMMARY OF THE INVENTION

In order to solve the disadvantages inherent to the prior art, according to the invention, there is provided a cut waste discharging device for a circular saw blade of an electric power circular saw machine, comprising: a safety cover for covering an upper portion of the circular saw blade; a lower guard which is angularly movable into the safety cover in accordance with development of a cutting operation of a workpiece with the circular saw blade; and a partition wall provided along an inner peripheral wall of the safety cover so as not to interfere with the lower guard, thereby defining a passage of cut waste with the outer wall of the partition wall and the inner peripheral wall of the safety cover.

With such an arrangement, the passage between the outer wall of the partition and the inner wall of the safety cover causes the cut waste, generated in the waste generating portion, to be led to a predetermined discharge place. Accordingly, the waste would not be splash within the safety cover and would not be splashed out of the predetermined discharge place.

According to the invention, the partition is composed of a pair of partition members integrally formed with the safety cover to thereby completely seal the passage on both sides.

According to another aspect of the invention, there is provided a cut waste discharging device for a circular saw blade of an electric power circular saw machine, comprising: a safety cover for covering an upper portion of the circular saw blade; a lower guard which is angularly movable into the safety cover in accordance with development of a cutting operation of a workpiece with the circular saw blade; and a pair of projections provided on a circumferential portion of the lower guard for defining a passage for cut waste with an inner wall of the safety cover when the lower guard is introduced into the safety cover.

The safety cover is composed of an integral one piece member to thereby define the passage substantially in a sealed fashion with the pair of projections and the lower guard.

According to still another aspect of the invention, there is provided a cut waste discharging device for a circular saw blade of an electric power circular saw machine, comprising: a safety cover for covering an upper portion of the circular saw blade; a lower guard which is angularly movable into the safety cover in accordance with development of a cutting operation of a workpiece with the circular saw; a front cover body having a substantially U-shaped cross section for covering a waste generating portion at a front portion of the circular saw blade; and a reference plate positionally adjustably connected to the safety cover; wherein the front cover body is connected to a part which is movable up and down relative to the safety cover when positional adjustment is effected to the reference plate, the front cover body having, at its lower edge, a skirt portion for covering the waste generating portion in contact with the reference plate and/or the workpiece, and the front body having, at its rear side, a shield portion embracing the circular saw blade for preventing cut waste from splashing rearwardly.

The structure further includes a rectifying plate interposed between the shield portion and a leading edge position of the lower guard held in a fully received position within the safety cover for directing the cut waste toward between the safety cover and the lower guard.

The skirt portion may be made of elastic material in sealing contact with the reference plate.

According to another aspect of the invention, there is provided a cut waste discharging device for a cutting machine having a cutting blade and a safety cover for covering the cutting blade, comprising: an inner guide wall for guiding cut waste into the safety cover; a discharge outlet formed in a side wall of the safety cover for discharging the cut waste which has been guided by the inner guide wall; and a guide cylinder disposed in the safety cover, extending in a direction perpendicular to a flow of the cut waste along the inner guide wall and being in fluid communication with the discharge outlet; the cylinder having a hole for introducing the cut waste thereinto and a guide plate for guiding the cut waste into the hole.

The guide cylinder is disposed intersecting with the flow of waste defined by the guide plate and the inner guide wall of the safety cover so that the flow of waste within the cylinder collides with the flow of waste defined by the guide plate and the inner guide wall of the safety cover at a right angle.

According to yet another aspect of the invention, there is provided a cut waste discharging device for a circular saw blade of an electric power circular saw machine, comprising: a safety cover for covering an upper portion of the circular saw blade; a lower guard which is angularly movable into the safety cover in accordance with development of a cutting operation of a workpiece with the circular saw blade; and a stop per disposed within the safety cover for limiting forward movement of a leading edge of the lower guard toward a front portion of the safety cover; wherein the lower guard is divided into a leading lower guard portion and a trailing lower guard portion, and one of the leading lower guard portion and the trailing lower guard portion is telescopically introduced into the other lower guard portion.

According to the invention, the lower guard is angularly moved in accordance with the development of the cutting operation of the workpiece. However, the lower guard is stopped with its leading lower guard portion being in abutment with the stop in a telescopic manner. For this reason, the waste would not be introduced into the lower guard and would be directed to the discharge outlet along the inner wall of the safety cover.

The structure may comprise a spring and limit means for normally maintaining one of the lower guard portion at a predetermined angular position relative to the other lower guard portion until the one of the lower guard portion is in abutment with the other lower guard portion.

The structure may comprise another spring and limit means for normally separating one of the lower guard portion at a predetermined angular position away from the other lower guard portion until the one lower guard portion is in abutment with a tip end of the workpiece.

The structure may comprise an auxiliary cover interposed between a reference plate which is movable in response to adjustment of cutting depth of the workpiece and a front portion of the safety cover for covering the circular saw blade, the auxiliary cover having a substantially U-shaped cross section and being movable together with the reference plate, wherein an inner wall of the auxiliary cover facing a tip edge of the circular saw is so formed that an interval between the inner wall of the auxiliary cover and the tip edge of the circular saw blade is gradually increased from a lower side to an upper side of the auxiliary cover.

The auxiliary cover is interposed between the reference plate and the safety cover. Since the auxiliary cover may be moved together with the reference plate, even if the reference plate would be moved in response to the adjustment of cutting depth of the workpiece, the positional relationship between the reference plate and the auxilairy plate would not be changed. Accordingly, it is possible to prevent the waste from splashing through a space between the reference plate and the auxiliary cover.

Also, since the interval between the inner wall of the auxiliary cover facing the tip edge of the circular saw blade and the tip edge of the circular saw blade is gradually increased from a lower portion to an upper portion of the auxiliary cover, the waste is led to a portion higher than the inner wall of the safety cover to thereby prevent the waste from splashing to the lower guard.

The structure may comprise an auxiliary cover interposed between a reference plate which is movable in response to adjustment of cutting depth of the workpiece and a front portion of the safety cover for covering the circular saw blade, the auxiliary cover having a substantially U-shaped cross section and being movable together with the reference plate, wherein an inner wall of the safety cover facing a tip edge of the circular saw is so formed that an interval between the inner wall of the safety cover and the tip edge of the circular saw blade is gradually increased from a front portion to a top portion of the safety cover.

The interval between the inner wall of the safety cover facing the tip edge of the circular saw blade and the tip edge of the circular saw blade is gradually increased from the front portion to the top portion of the safety cover. Thus, the waste which has been directed to the auxiliary cover is led to a portion higher than the inner surface of the safety cover to thereby prevent the waste from splashing to the lower guard.

DESCRIPTION OF THE PREFERRED EMBODIMENTS

The present invention will now be described with reference to the accompanying drawings.

Figure 3:
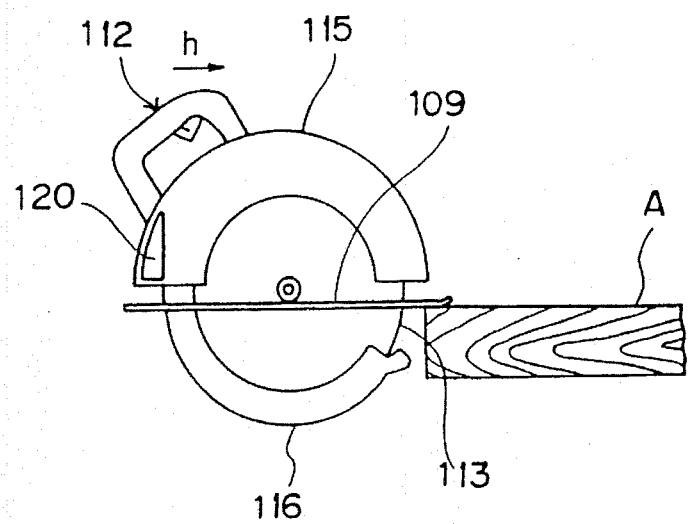
FIG. 3 is a side elevational view showing the cover structure shown in FIGS. 1 and 2.
Figure 4:
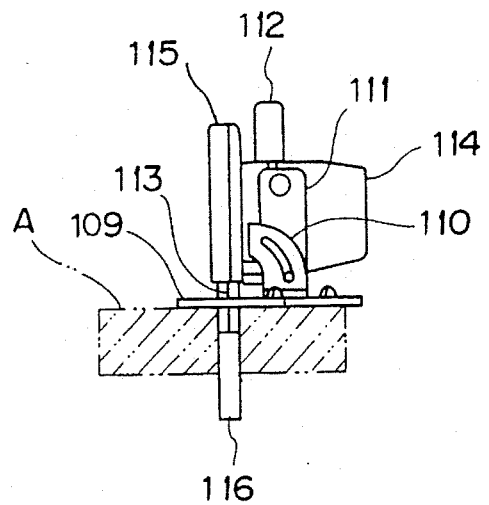
FIG. 4 is a frontal view showing the cover structure shown in FIGS. 1 and 2.

As shown in FIGS. 3 and 4, an electric circular saw having a cover structure for a circular saw blade according to the invention includes a bracket 110 for rotation of the circular saw and a bracket 111 mounted on the rotational bracket 110 for up and down movement of the circular saw. A circular saw body 112 is mounted on the up and down movement bracket 111.

A circular body 112 includes a motor 114 for driving a circular saw blade 113 and is adjustably movable relative to a reference plate 109. More specifically, a slant angle of the circular saw body 112 may be adjusted relative to the the reference plate 109 by rotating the up and down movement bracket 111 relative to the rotational bracket 110. Thus, the circular saw blade 113 is slanted relative to the reference plate 109 to thereby adjust a cutting angle. Also, it is possible to adjust a height of the circular saw blade 113 relative to the reference plate 109 by moving the circular saw blade 113 up and down relative to the up and down movement bracket 111 to thereby adjust a cutting depth.

The circular saw body 112 includes a safety cover 115 for covering an upper portion of the circular saw blade 113 and a lower guard 116 which rotates into the safety cover 115 in accordance with development of cutting of a workpiece A by the circular saw blade 113.

In order to cut the workpiece A with the electric circular saw having the structure described above, as shown in FIG. 3, the electric circular saw is fed by grasping a handle 112 in a direction indicated by an arrow h in FIG. 3 relative to the workpiece A held in a stationary manner, so that the rotating circular saw 113 is brought into contact with the workpiece A. The lower guard 116 rotates upwards by being pressed by a tip end of the workpiece A and enters the safety cover 115 in accordance with the development of the cutting of the workpiece, cut waste or debris generated at a cut waste generating portion 117 (FIG. 1) at a front portion of the circular saw blade 113 will flow along an inner wall of the safety cover 115 as described later and is discharged from a discharge outlet of the safety cover 115 to a predetermined place.

Figure 1:
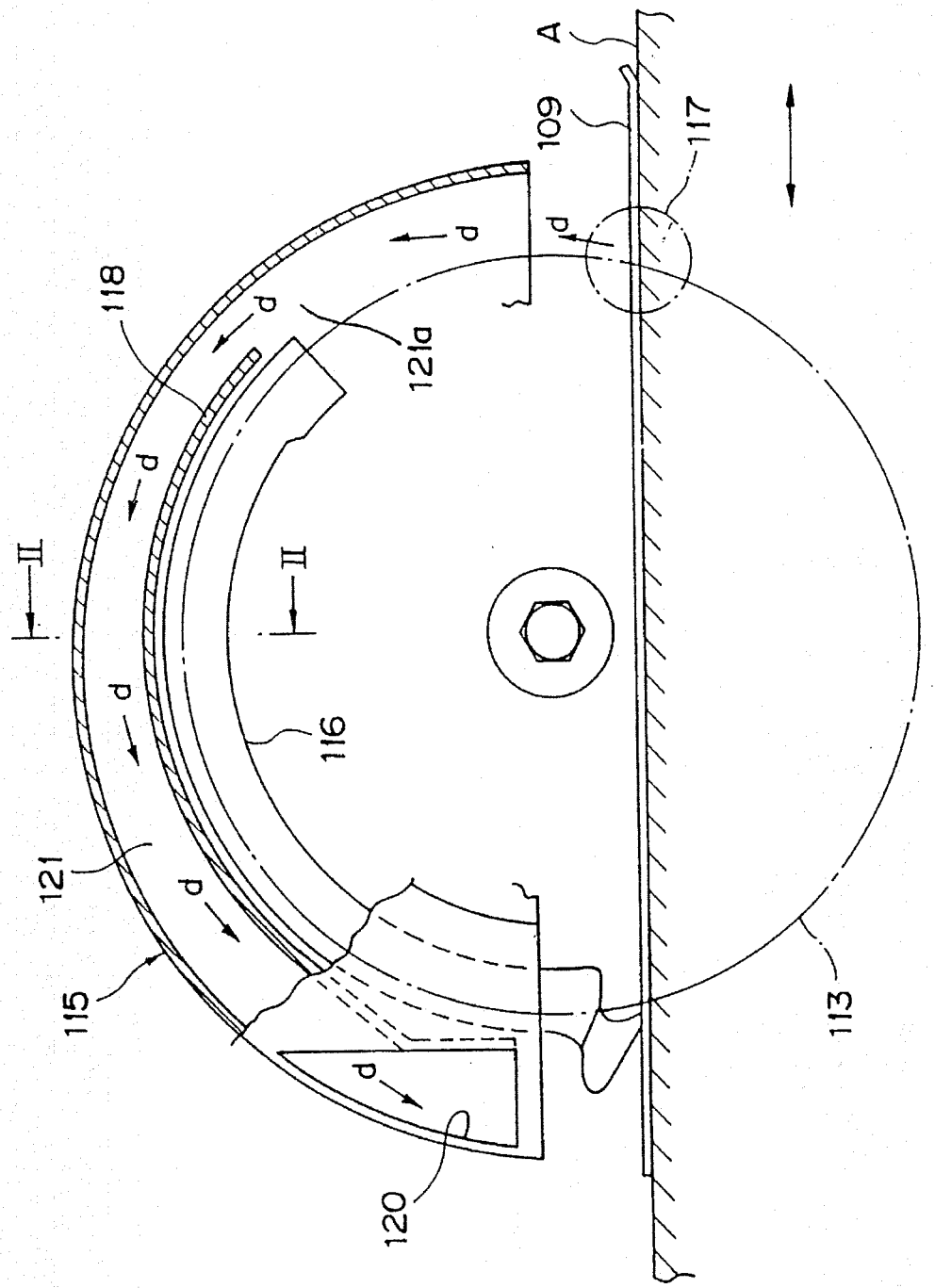
FIG. 1 is a vertical cross sectional view showing a cover structure according to one embodiment of the invention.
Figure 2:
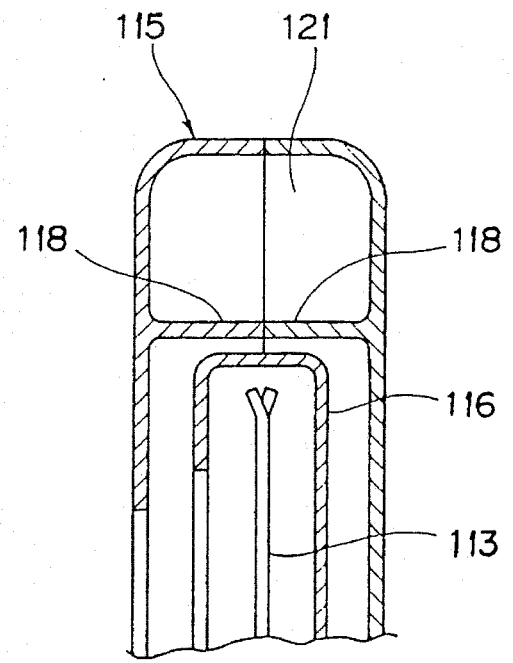
FIG. 2 is a fragmentary sectional view showing the cover structure taken along the line II—II of FIG. 1.

As shown in FIGS. 1 and 2, a partition wall 118 is provided along an inner wall of the safety cover 115 so as not to interfere with the movement of the lower guard 116. The partition wall 118 is formed integrally with the safety cover 115. For the sake of easy manufacture, the partition wall 118 as well as the safety cover 115 is divided into two halves.

Since the partition wall 118 is thus formed, a space between an outer peripheral surface of the partition wall 118 and the inner wall of the safety cover 115 forms a tunnel shaped passage 121 through which cut waste may pass.

An inlet 121a of the passage 121 is opened approximately just above the waste generating portion 117 and the outlet of the passage 121 is in fluid communication with the discharge outlet 120 for the cut waste.

Thus, the waste enters from a front portion of the safety cover 115, flows along the inner wall of the safety cover 115, enters the passage 121 from the inlet 121a and flows through the passage 121 toward the outlet 120 as best shown in FIG. 1 by arrows d.

Subsequently, the operation of the structure of the above described circular saw cover will be explained as well as the cutting operation.

As shown in FIGS. 3 and 4, when the electric circular saw is applied to the workpiece A from above and fed in the direction indicated by the arrow, the lower guard 116 is rotated into the safety cover 115 by being pressed by the tip end of the workpiece A.

Figure 20:
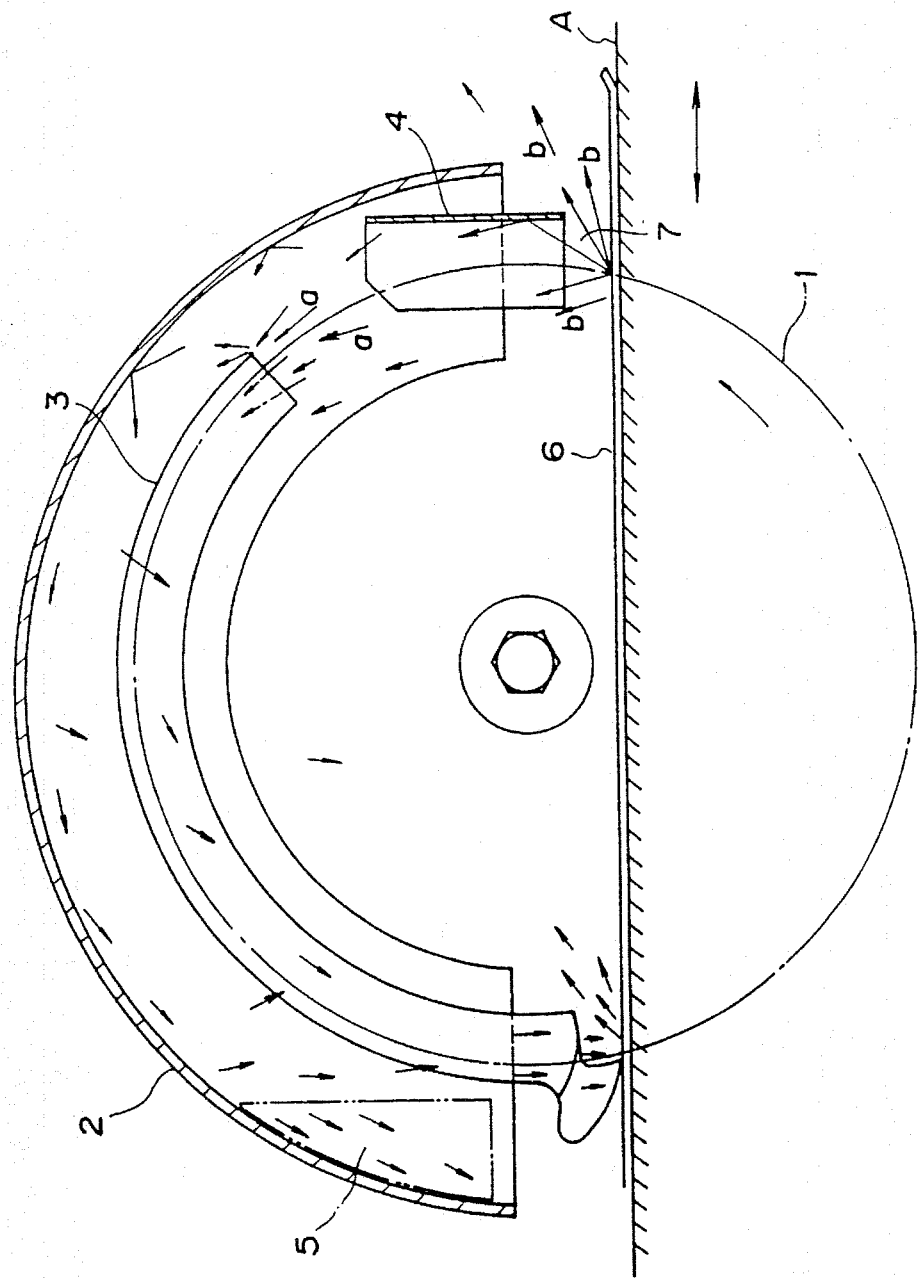
FIG. 20 is a fragmentary side elevational view showing a cover structure according to prior art.
Figure 21:
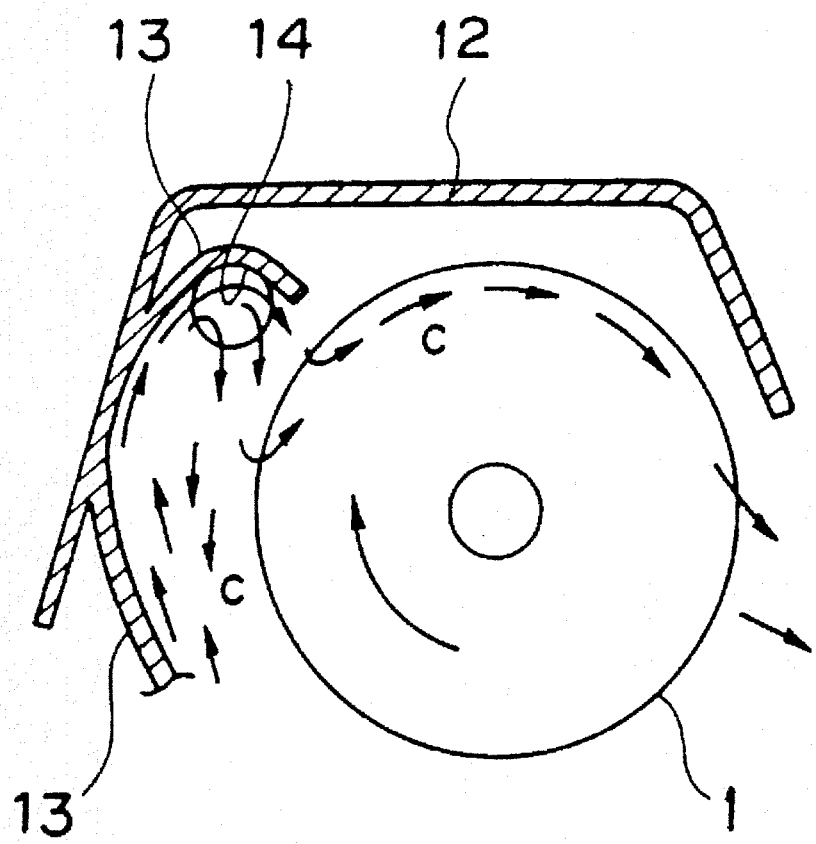
FIG. 21 is a side elevational sectional view showing a cutting machine according to prior art.

Also, the cut waste or debris generated by cutting the workpiece A will flow toward a front inner surface of the safety cover 115 as shown in FIGS. 1 and 2. The waste will flow through the passage 121 to the rear portion thereof and will be discharged from the discharge outlet 120. Accordingly, a flow directed in directions indicated by arrows a in FIG. 20 is eliminated and the waste will not irregularly splash to the outside.

Figure 5:
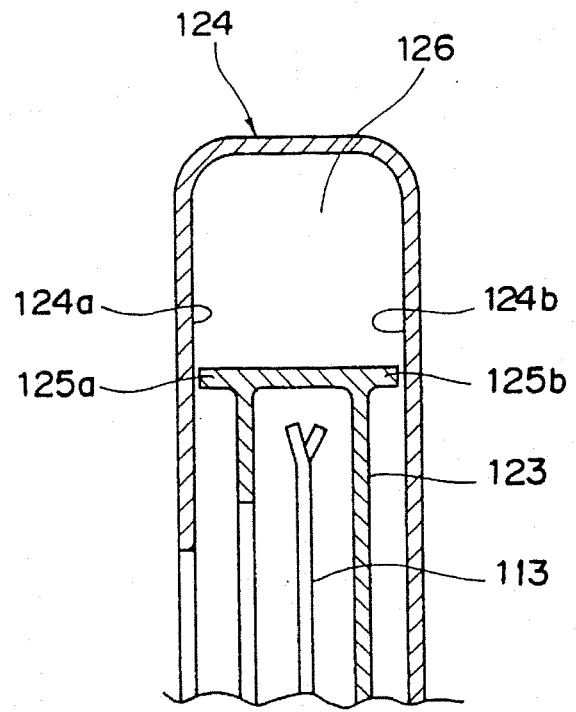
FIG. 5 is a fragmentary cross sectional view, similar to FIG. 2, showing a cover structure in accordance with another embodiment of the invention.

The above described passage 121 may be formed as shown in FIG. 5. Reference numeral 123 in FIG. 5 denotes a lower guard which has been introduced into the safety cover 124. A pair of projections 125a and 125b which project toward the two inner walls 124a and 124b of the safety cover 124 confronted with each other are provided on an outer periphery of the lower guard 123.

Since the two projections 125a and 125b face the inner walls 124a and 124b of the safety cover 124, a passage 126 for cut waste is formed among the outer surface of the lower guard 123, the outer surfaces of the projections 125a and 125b and the inner wall of the safety cover 124. Unlike the foregoing embodiment, since the partition wall 118 is not integrally formed with the safety cover 124, it is possible to make the safety cover 124 in an integral structure rather than a two divided structure.

As described above, according to the invention, it is possible to avoid the splashing of the waste within the safety cover but to lead the waste to the predetermined discharge outlet.

Also, it is possible to make the safety cover in an integral structure with the projections on the lower guard instead of the partition wall for forming the waste passage.

Another embodiment of the present invention will now be described with reference to FIGS. 6 and 7 in which the same reference numerals as those used in FIGS. 1 to 4 are used to denote the like components or members.

Figure 6:
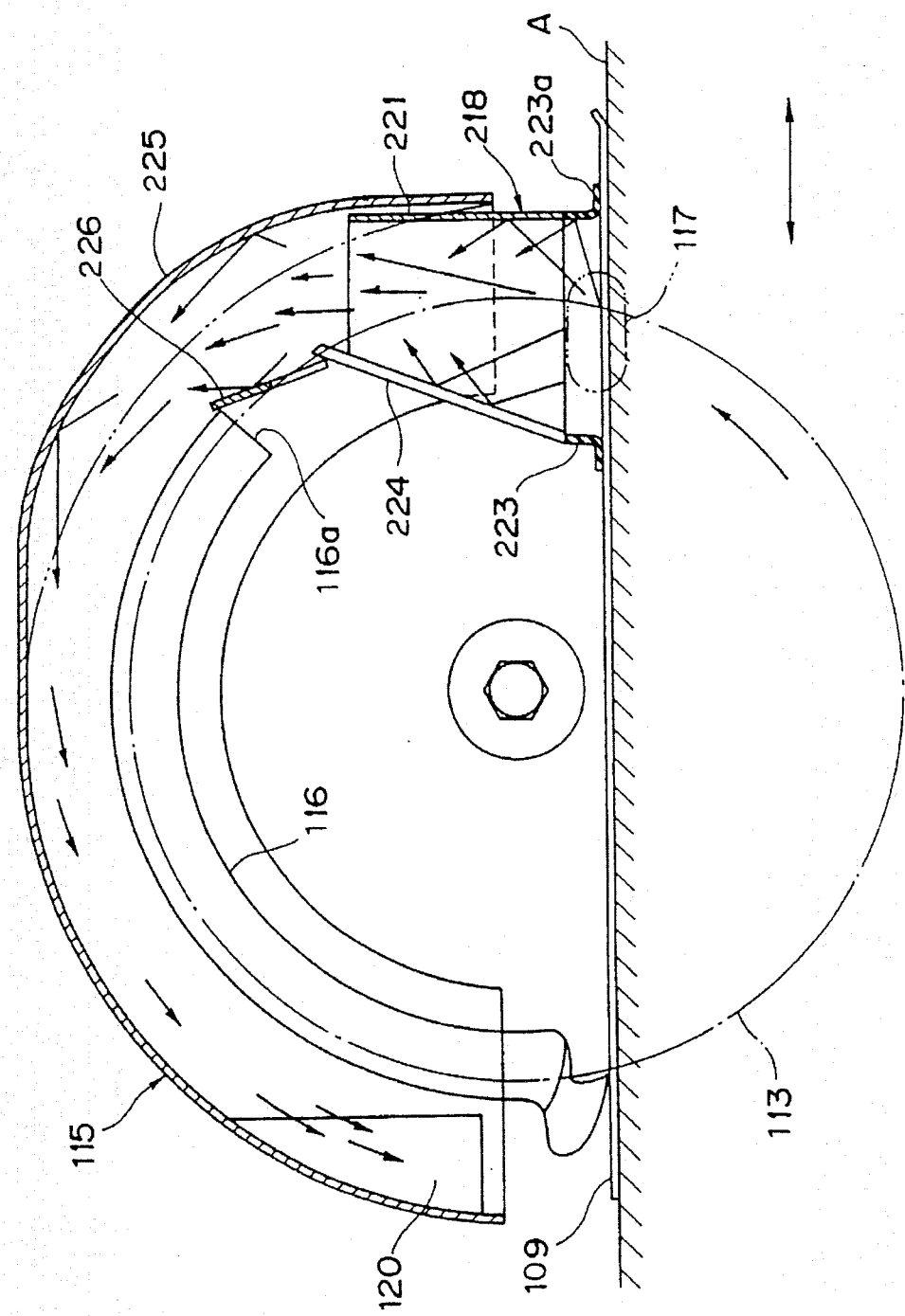
FIG. 6 is a vertical sectional view showing a cover structure for a circular saw machine in accordance with another embodiment of the invention.
Figure 7:
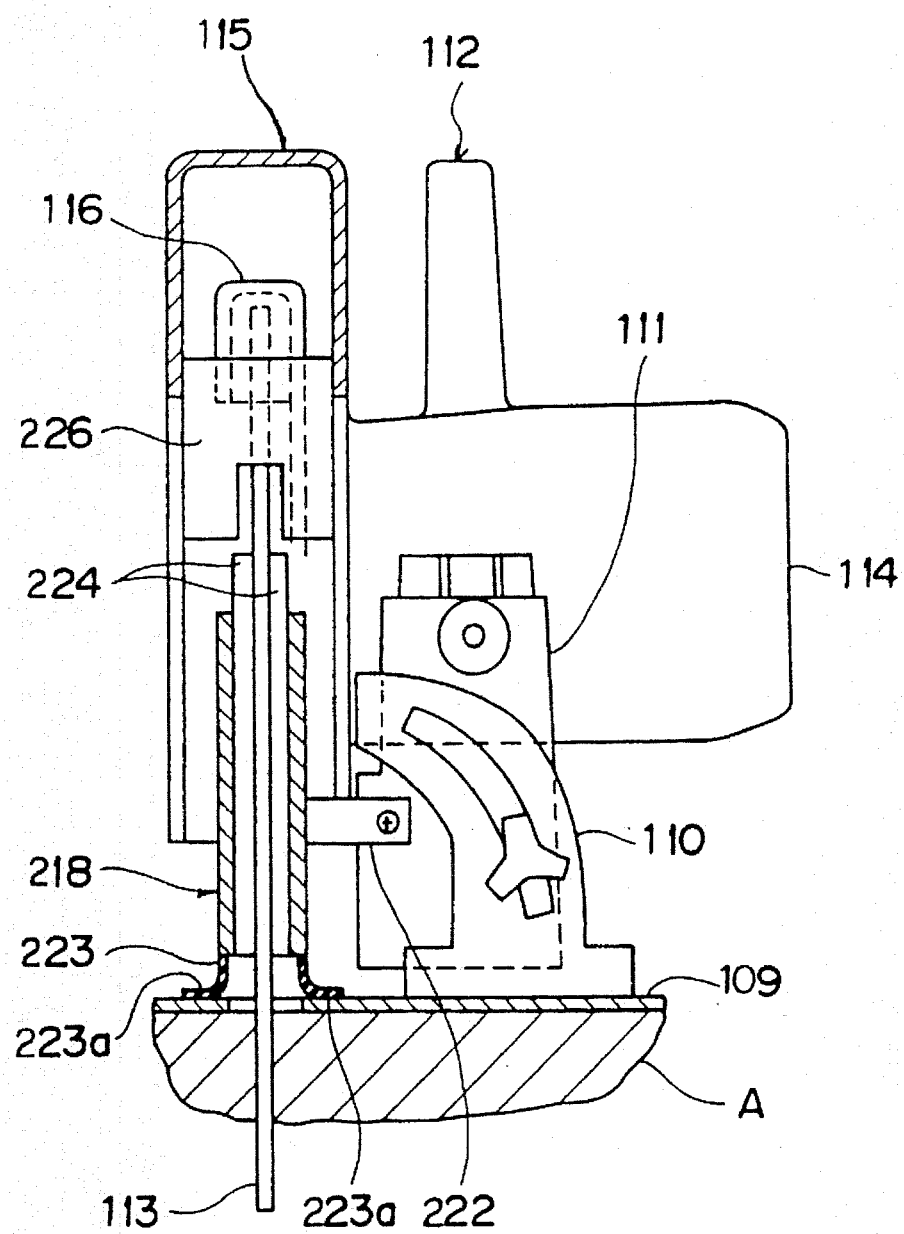
FIG. 7 is a fragmentary cross sectional view of the cover structure, shown in FIG. 6, as viewed from the front side.

In this embodiment shown in FIGS. 6 and 7, the circular saw body has a front cover 218 having a U-shaped cross section for covering the cut waste generating portion 117 (FIG. 6).

As shown in FIGS. 6 and 7, a front cover body 221 of the front cover 218 is mounted movably up and down relative to a safety cover 115 for positional adjustment of a reference plate 109. Namely, the front cover body 221 is securely fixed to the up and down movement bracket 111 through an arm 222. For this reason, even if the circular saw body 112 is raised relative to the up and down movement bracket 111, the front cover 218 is kept at a constant position above the reference plate 109.

The front cover body 221 is made of a bent plate having a U-shaped cross section and held in an upright position, with its upper portion being inserted into the safety cover 115 and its lower portion being located between a lower edge of the safety cover 115 and the reference plate 109.

The front cover body 221 is provided at its lower portion with a skirt portion 223 contacting the reference plate 109 on the base side or the workpiece A and covering the waste generating portion 117. The skirt portion 223 is made of elastic material such as rubber. Its upper end is fixed to a lower edge of the front cover body 221, whereas its lower skirt 223a is elastically deformed and kept in contact with a surface of the reference plate 109. Incidentally, depending upon a shape of the reference plate 109, the skirt 223a of the skirt portion 223 might be brought into contact with the surface of the workpiece A. Also, since the skirt portion 223 is made of rubber, the skirt 223a of the skirt 223 may contact against the surface of the reference plate 109 and/or the workpiece A during the slant cutting operation.

With such an arrangement, the waste generating portion 117 is completely surrounded by the skirt 223a so that the cut waste would not be splashed to the outside through a gap between the front portion of the safety cover 115 and the reference plate 109. The waste is raised within the skirt portion 223 and introduced into the front cover 218. Also, since the front cover body 221 is connected on the base side as described above, even if the cutting depth is kept at minimum, it is possible to cover the waste generating portion 117.

The rear portions of the front cover body 221 are extending to embrace the circular saw blade 113 with rear edges being slanted obliquely toward the inner wall of the front portion of the safety cover 115. A pair of shield members 224 are provided at the rear edges of the rear portions of the front cover body 221 so as to embrace the circular saw 113 to thereby prevent the cut waste from splashing rearwardly. The shield members 224 are made of elastic material such as sponge rubber adhered to the two parallel rear edges of the front cover body 221.

With such an arrangement, the cut waste which has passed upward within the skirt portion 223 will be directed toward the inner wall surface of the safety cover 115 while colliding with the inner surfaces of the front cover body 221 and the shield members 224 or while directly splashing without any collision. In any case, the waste will not be directed to the inner surface of the lower guard 116.

An expansion portion 225 which is expanded in a curved fashion from an arcuate line along the circular saw blade 113 toward the outside is formed from a position of the safety cover 115 facing the upper portion of the front cover 218 to a position of the safety cover 115 reaching a position just above the centerline of the circular saw 113.

The waste flying upwardly from the front cover 218 has an upward reflective angle while contacting the inner surface of the expansion portion 225. Thus, the waste will be directed to the discharge outlet 120 along the inner wall of the safety cover 115 without splashing toward the inner wall of the lower guard 116.

In the foregoing embodiment, it is possible to provide a flow rectifying plate 226 between top portions of the shield members 224 and a tip end 116a of the lower guard 116 that has been fully received in the safety cover 115. In this case, the flow rectifying plate 226 is securely fixed to the inner wall of the safety cover 115 so as to embrace peripetal portions of teeth of the circular saw blade 113. The waste that has been discharged from the front cover 218 is brought into collision with the rectifying plate 226 and is reflected to the inner wall of the safety cover 115. As a result, the waste is directed to the space defined between the safety cover 115 and the lower guard 116 without splashing toward the inner wall of the lower guard 116. The waste which is flowing along the safety cover 115 will be discharged from the discharge outlet 120 of the rear portion of the safety cover 115 toward a predetermined outside position.

The operation of the cover structure of the circular saw will be explained as well as the cutting operation of the workpiece.

When the electric circular saw is applied to the workpiece A from above and fed forwardly, the lower guard 116 is pushed by the tip end of the workpiece A and is rotated into the safety cover 115.

The waste generated from the workpiece A is guided by the inner walls of the skirt portion 223 and the front cover body 221 and is directed to the inner wall of the safety cover 115.

The end of the lower guide 116 is positioned at a position shown in FIG. 6 due to the development of cutting operation of the workpiece A. Even in such a case, the rectifying plate 226 shields the splashing action of the waste toward the inner wall of the lower guard 116. Accordingly, the waste will not splash to the outside except from the discharge outlet 120.

A cut waste collection efficiency of the foregoing embodiment was measured and the following results are obtained.

| cutting depth | cover structure | |
|---|---|---|
| | prior art | present invention |
| 75 mm | 70% | 95% |
| 45 mm | 65% | 94% |

The measurement method was that a piece of wood (which was 39 mm thick and 500 mm long) was cut three times by the electric circular saw according to the present invention and by that of the prior art, respectively. The waste was collected by a cut waste collection body mounted on the discharge outlet of the safety cover. A weight (A) of the waste and a weight (B) of the waste that had been splased to the outside without collection were measured with an electronic scale. The cutting depths of 75 mm and 45 mm were based upon FIGS. 6 and 7. The collection efficiency was calculated by the following expression:

$$A/(A+B) \times 100$$

As has been described above, with such an arrangement of the present invention, it is possible to cover the waste generating portion with the skirt portion, and to prevent the waste, which has been generated by the cutting operation of the workpiece, from splashing to the outside through a space between the safety cover and the workpiece or the like.

Also, according to the invention, it is possible to surround in a sleeve fashion an upper portion of the skirt portion as well as the front cover body by the shield members located in a rear portion of the front cover body. It is therefore possible to direct the waste, that has been raised in the skirt portion, to a space defined between the outer wall of the lower guard and the inner wall of the safety cover. Accordingly, it is possible to prevent the waste from splashing to the outside along the inner wall of the lower guard.

According to the invention, it is possible to provide a rectifying plates 226 thereby directing the waste, that has splashed upward of the front cover body, toward the inner wall of the safety cover. Accordingly, it is possible to prevent the waste from invading into the lower guard through a space between the upper end portions of the shielding members and the tip end of the lower guard which has been fully received in the safety cover and from splashing outwards.

Still another embodiment of the invention will now be described with reference to FIGS. 8 and 9, in which a cutting circular saw blade 113 is covered by a safety cover 115. The cutting debris or waste generated by the cutting operation of the workpiece will be introduced or entrained into the safety cover 115 by the rotational flow of the cutting circular saw blade 113. A guide wall 307 is provided in the safety cover 115 for guiding the waste. Also, a circular discharge outlet 308 is provided in a side wall of the safety cover 115 for discharging the waste that has been guided by the guide wall 307.

The following structure is provided in the vicinity of the discharge outlet 308 for further ensuring the discharge of the waste. Namely, a guide cylinder 309 is provided in the safety cover 115 so as to extend in a direction perpendicular to a direction of flow of the waste and is in fluid communication with the discharge outlet 308. A hole 310 is provided in the cylinder 309 for introducing the waste to the cylinder 309, and at the same time, a guide plate 311 is mounted on the cylinder for interrupting the rotational flow of the cutting blade 113 and guiding the waste to the hole 310.

The cylinder 310 is arranged so as to transverse the safety cover 115 and is formed integrally with the safety cover 115. One end of the cylinder 310 for forming the discharge outlet 308 is projected to the outside of the safety cover 115. The projected end is connected to a conduit 312 for introducing the waste to a dust bag (not shown).

The hole 310 formed in the cylinder 309 is substantially in the form of a rectangular shape directed obliquely downwardly and its upper edge is connected integrally with the guide wall 307. The guide plate 311 is extending downwardly from the lower edge of the hole 310 so as to form the passage 313 for the waste as well as the guide wall 307. With the guide plate 311, it is possible to prevent the waste from being entrained by the rotating cutting blade 113.

Thus, the waste generated below the cutting blade 113 such as a circular saw enters from the hole 310 into the cylinder 309 through the passage 313 defined between the guide wall 307 and the guide plate 311. The waste forms eddy currents in the cylinder 309 toward the discharge outlet 308 as indicated by arrows e.

Figure 8:
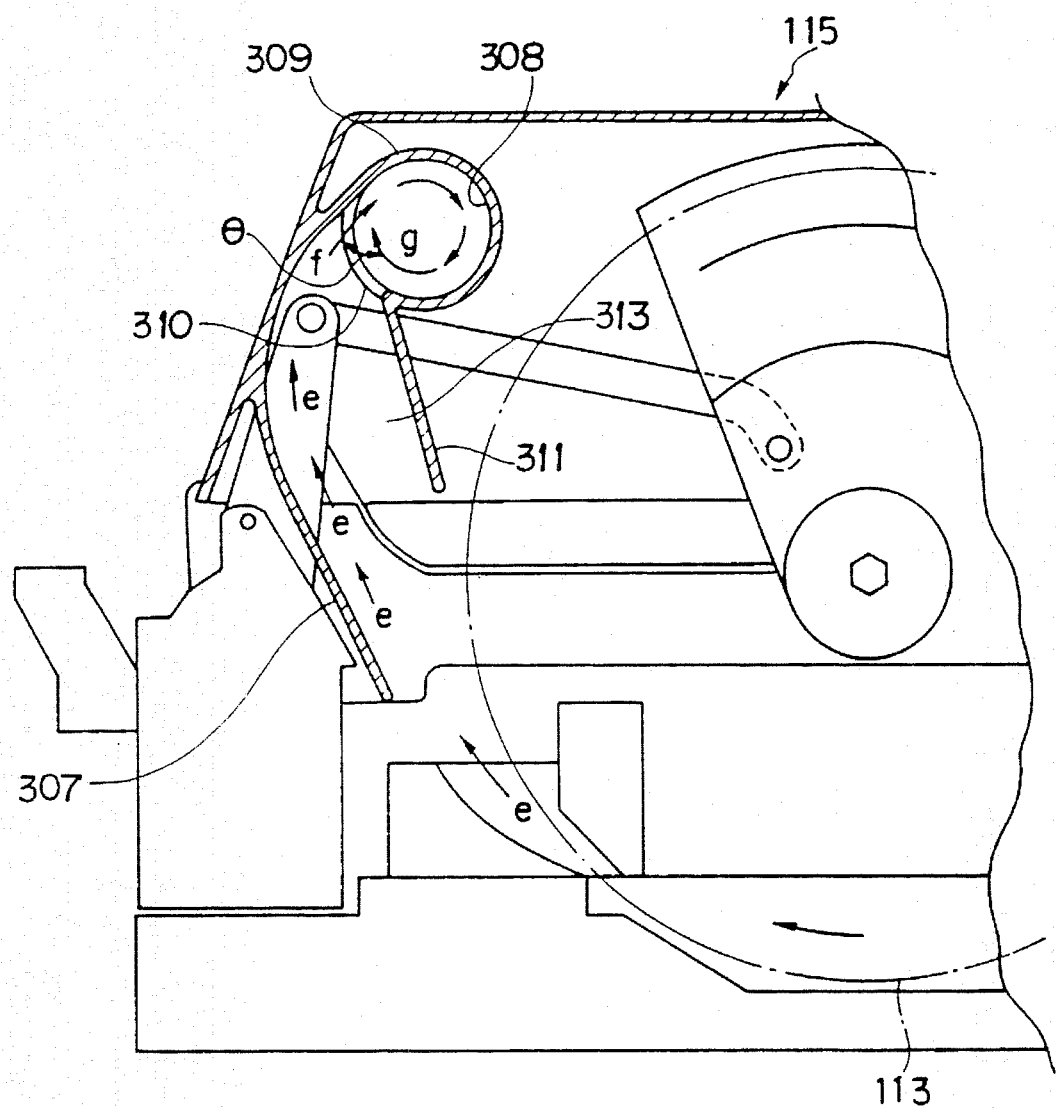
FIG. 8 is a side elevational view showing a waste discharging device for a cutting machine in accordance with the invention.
Figure 9:
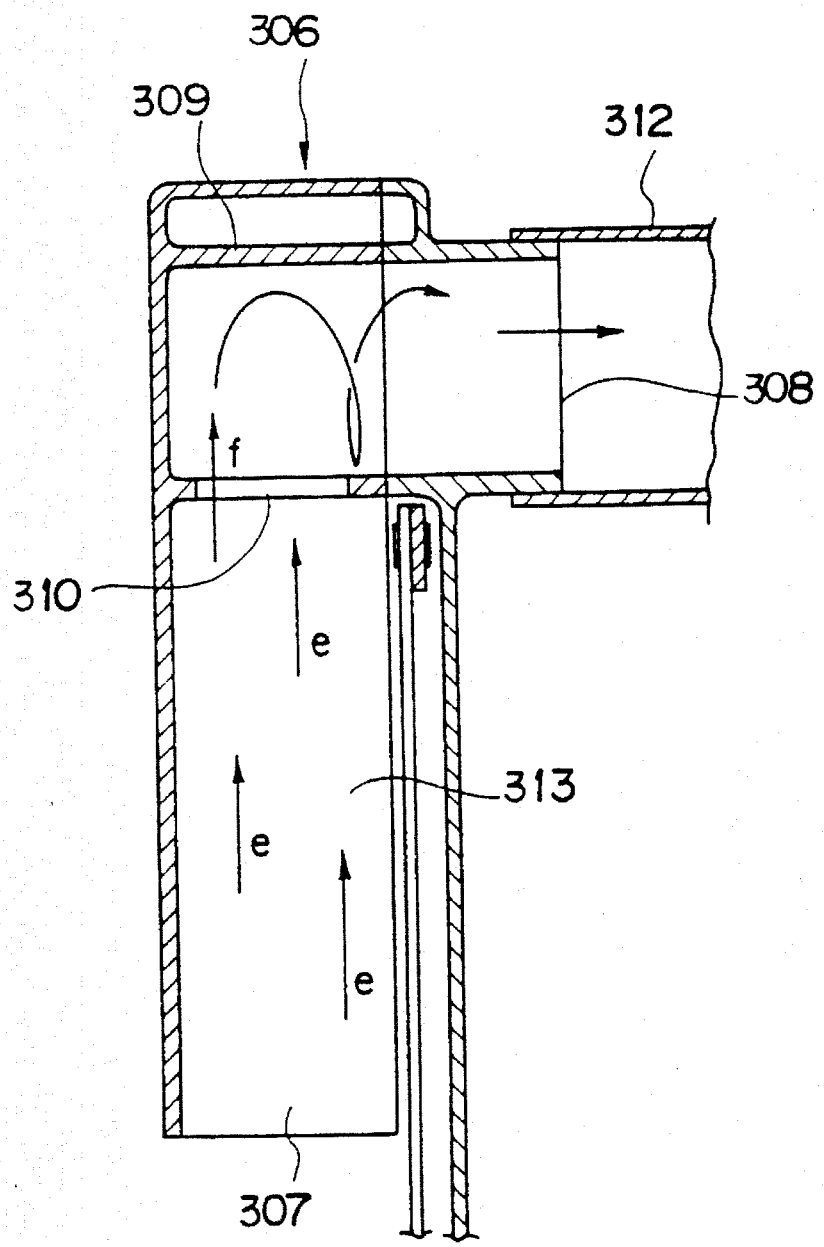
FIG. 9 is a frontal vertical sectional view showing a primary part of the waste discharge device shown in FIG. 8.

As shown in FIG. 8, the cylinder 309 and its hole 310 are provided so that the flow of waste indicated by arrows g toward the hole 310 while conducting a swirl motion within the cylinder 309 is collided at a right angle or an acute angle theta against to the waste flow that has been raised from below along the guide wall 307 in the direction indicated by the arrow f.

Thus, the resistance to be applied to the flow of waste is reduced and the waste is smoothly introduced into the cylinder 309.

With such an arrangement, according to the invention, it is possible to lead the waste, that has been raised by the rotation of the cutting blade, to the discharge outlet while imparting the eddy rotational motion to the waste flow. Accordingly, it is possible to prevent the waste from falling down to the bottom of the safety cover before reaching the discharge outlet and from being diffused within the safety cover to thereby much enhance the collection efficiency.

Still another embodiment of the invention will now be described with reference to FIGS. 10 to 13. As shown in FIGS. 10 to 13, a cover structure includes a safety cover 115 for covering a circular saw blade 113, and a lower guard 116 which rotates into the safety cover 115 together with the development of the cutting operation of the workpiece A.

The safety cover 115 is integrally formed with a case 412 for supporting a rotary shaft 410 of the circular saw blade 113 together with a bearing 411. The lower guard 116 is divided into a leading lower guard portion 413 to be introduced into the safety cover 115 in advance and a trailing lower guard portion 414 to be introduced later into the safety cover 115.

The leading lower guard portion 413 is somewhat larger in size than the trailing lower guard portion 414 so that the trailing lower guard portion 414 may enter into the leading lower guard 413 to form an overlapping structure. However, of course, it is possible to make the trailing lower guard portion 414 larger in size than the leading lower guard portion 413.

The trailing lower guard portion 414 is provided with a ring portion 416 which is in sliding contact with an outer periphery of a sleeve portion 415 for supporting a bearing 411 of the case 412. Since the ring portion 416 may be rotated about the sleeve portion 415, the trailing lower guard portion 414 may be rotated along an outer circumferential periphery of the circular saw blade 113 between a lower portion of the safety cover 115 and the interior of the safety cover 115.

The leading lower guard portion 413 has a ring portion 417 which is in sliding contact with an outer periphery of the ring portion 416 of the trailing lower guard portion 414. Since the ring portion 417 may be rotated about the ring portion 416 of the trailing lower guard 414, the leading lower guard 413 may be rotated along the outer circumferential periphery of the circular saw blade 113 between the lower portion of the safety cover 115 and the interior of the safety cover 115. Also, the leading lower guard portion 413 may encase therein the trailing lower guard portion 414.

Figure 10:
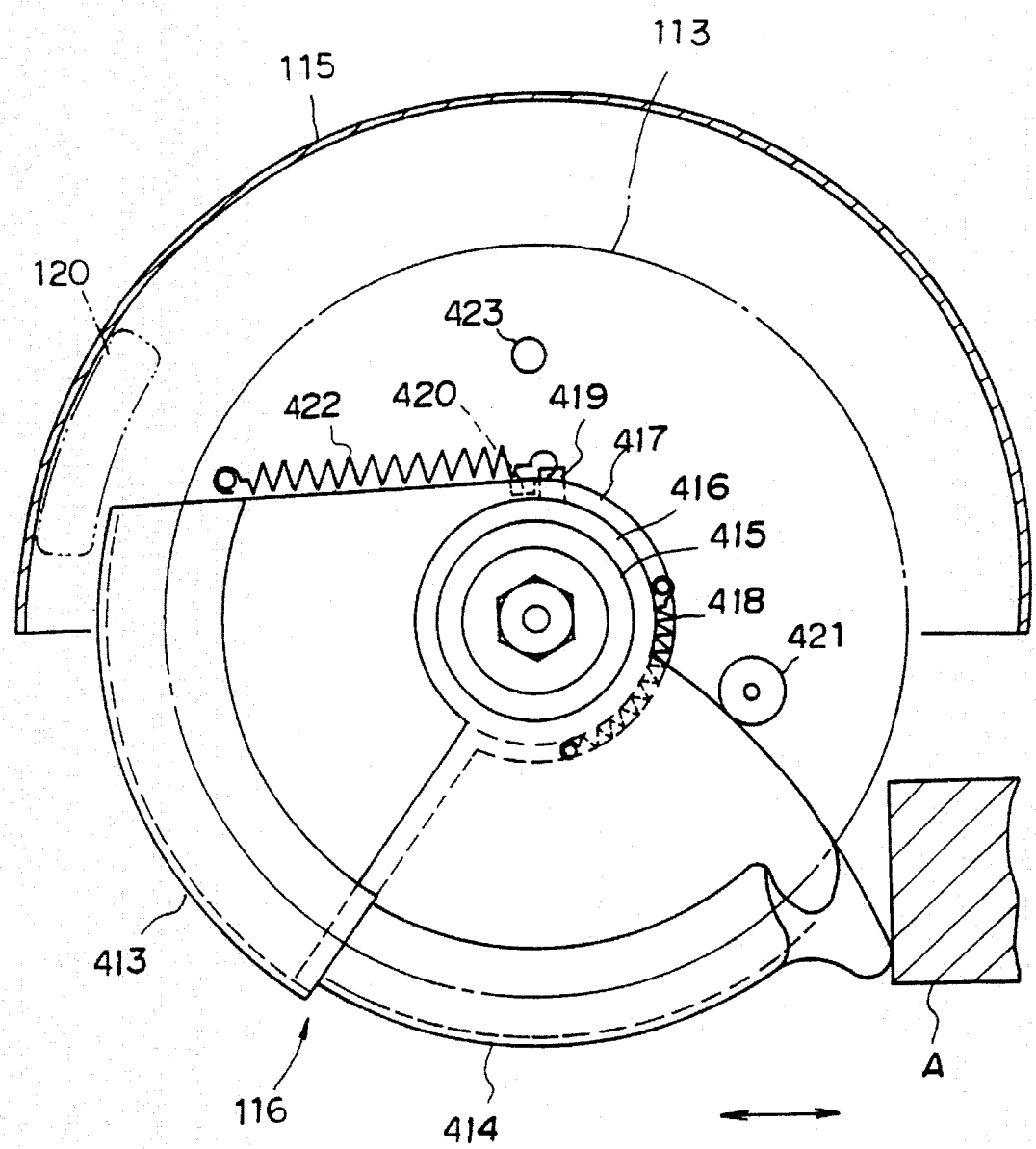
FIG. 10 is a fragmentary side elevation view showing a cover structure for a circular saw machine in accordance with still another embodiment of the invention.

The leading and trailing lower guard portions 413 and 414 are always pulled by a first coiled tension spring 418 in a direction where these two components are urged away from each other from the state shown in FIG. 10. More specifically, one end of the first coiled tension spring 418 is laid at the ring portion 417 of the leading lower guard portion 413 and the other end is laid along the ring portion 417 in a clockwise direction (in FIG. 10) from its one end and hooked at the ring portion 416 of the trailing lower guard portion 414.

If there is no limit means for limiting the movement of these components, the components are separated away from each other. Accordingly, in order to avoid the free movement and to maintain a positional relationship of these components as shown in FIG. 1, projections 419 and 420 which are to contact with each other are provided on the two ring portions 416 and 417, respectively.

Figure 11:
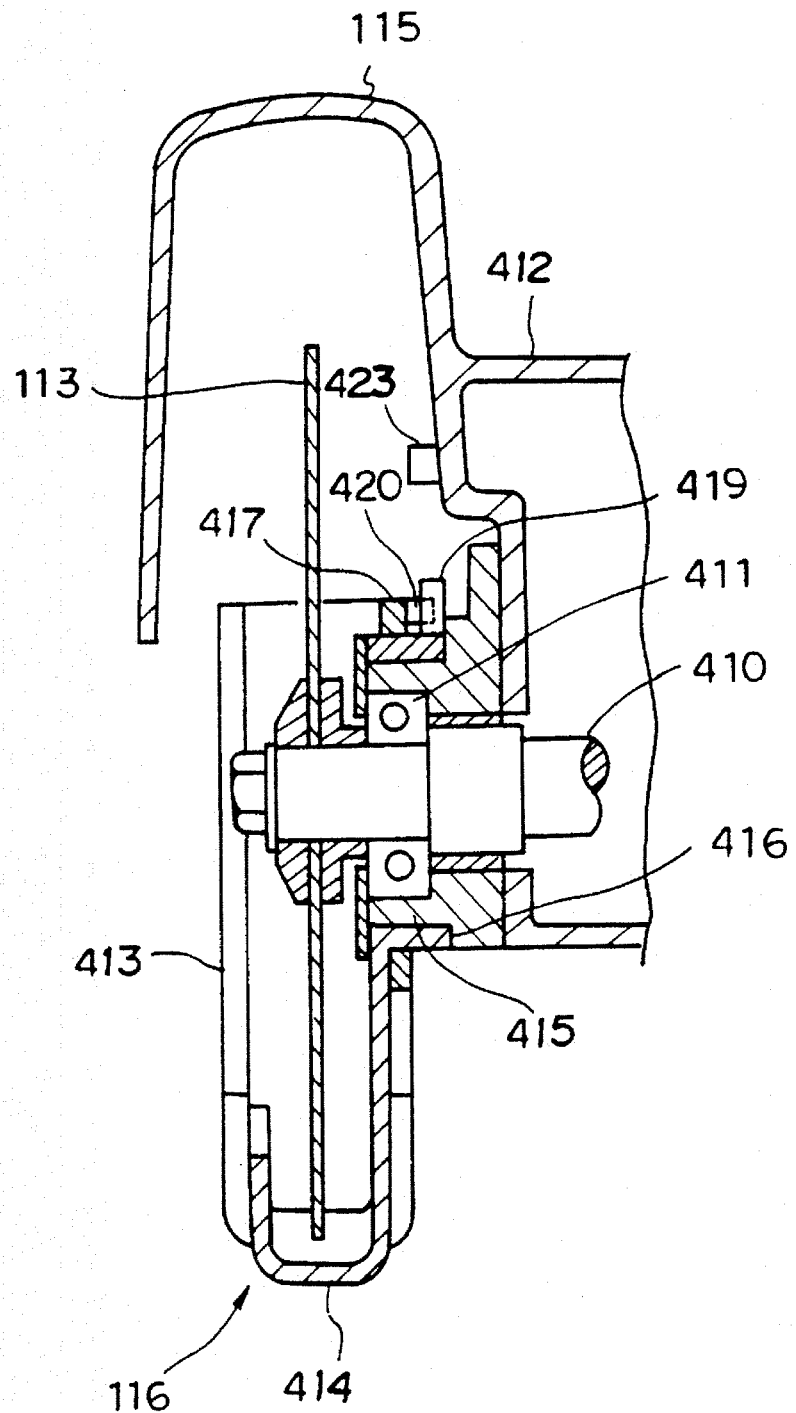
FIG. 11 is a vertical frontal sectional view showing the cover structure shown in FIG. 10.
Figure 12:
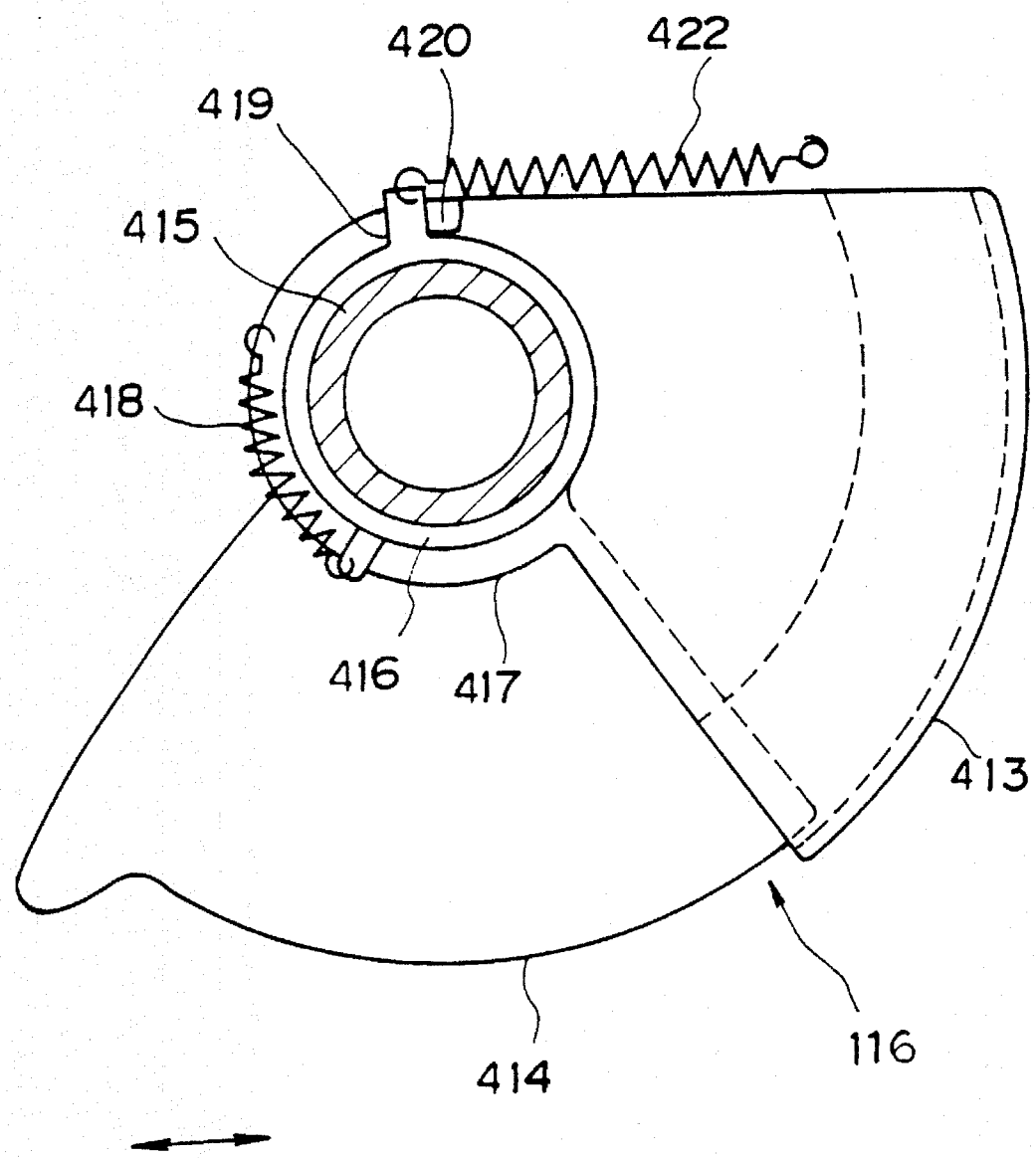
FIG. 12 is a backside view of the lower guard as viewed from the opposite side to the side shown in FIG. 10.

More specifically, as shown in FIG. 11, the ring portion 416 of the trailing lower guard portion 414 is wider in width than the ring portion 417 of the leading lower guard portion 413 and extends to the case 412. The projection 419 which projects perpendicular to the axial direction of the rotary shaft 410 is provided at the extending portion. The other projection 420 is provided at the associated ring portion 417 so that the projection 420 extends in parallel to the axial direction of the rotary shaft 410 and is to be brought into contact with the projection 419 in the clockwise direction (in FIG. 10).

With such an arrangement, when the workpiece A is not cut, the leading and trailing lower guard portions 413 and 414 take a position shown in FIG. 10 against the spring force of the first coiled spring 418.

Figure 13:
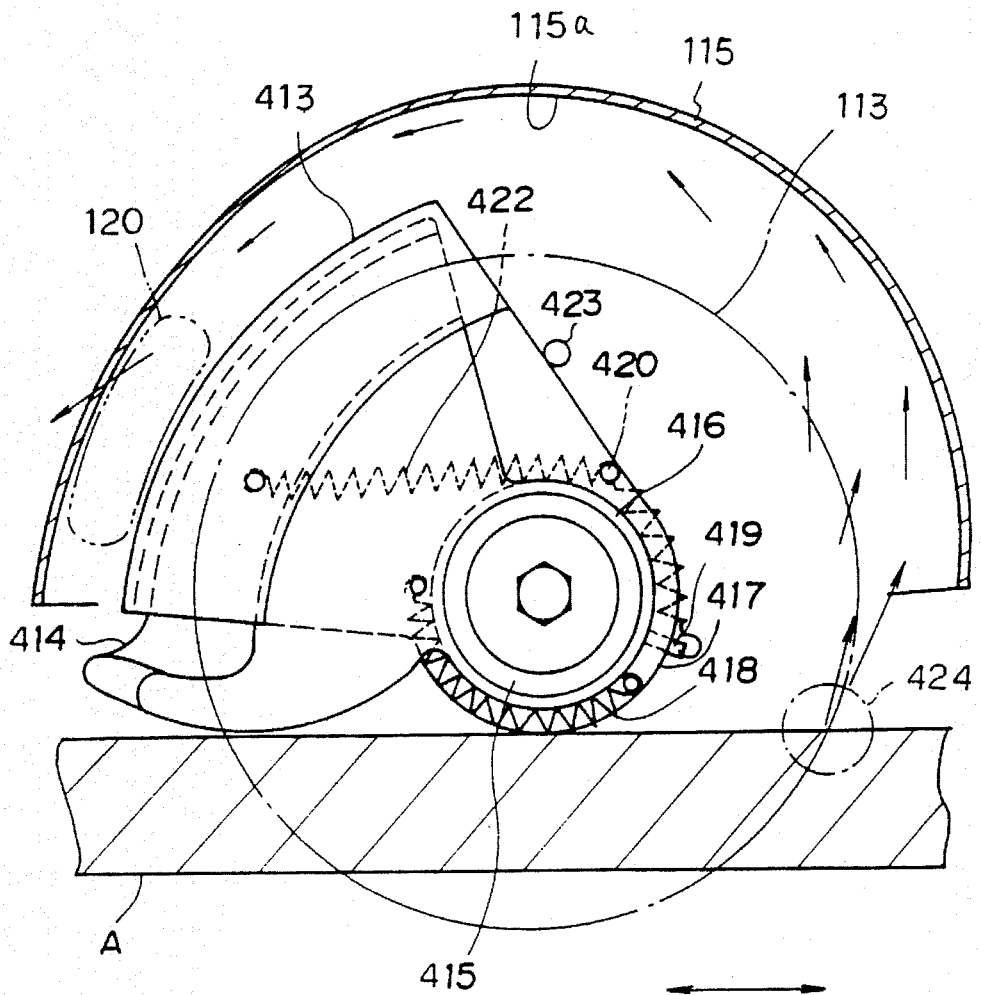
FIG. 13 is a fragmentary side elevational view showing the cover structure shown in FIG. 10.

The lower guard 116 must cover the lower portion of the circular saw blade 113 as shown in FIG. 10 in the non cutting state, and must be angularly moved into the safety cover 115 while being pushed by the workpiece in the cutting state as shown in FIG. 13.

In order to meet this requirement, as shown in FIG. 10, a first stopper 421 for stopping the counterclockwise rotation of the lower guard 116 is fixed at a trailing edge of the trailing lower guard portion 414 on the safety cover 115 side.

On the other hand, a second coiled tension spring 422 is interposed between the projection 419 of the trailing lower guard portion 414 and the safety cover 115 for depressing the lower guard 116 in the counterclockwise direction against the first stopper 421.

A second stopper 423 is fixed within the safety cover 115 for limiting the angular movement of the leading edge portion of the lower guard 116 into the front portion of the safety cover 115 during the cutting operation. The second stop per 423 is located above the rotary shaft 410 of the circular saw blade 113 as shown in FIGS. 10 and 13.

With such an arrangement, when the leading lower guard portion 413 is stopped with the leading edge portion of the leading lower guard portion 412 being in abutment with the second stopper 423 as the cutting operation is advanced, the leading edge portion is located remote from the front portion of the safety cover 115 where a cut waste portion is generated.

Then, even after the leading lower guard portion 413 has been stopped in abutment with the second stopper 423, the trailing lower guard portion 414 is still rotated and enters the leading lower guard portion 413 against the biasing force of the first coiled spring 418. The trailing lower guard portion 414 is stopped in an overlapping telescopic state with the leading lower guard portion 413.

During the cutting operation of the workpiece A with this electric circular saw, when the rotating circular saw blade 113 abuts against the workpiece A and is advanced, the lower guard 116 is pushed by an end face of the workpiece A. The leading and trailing lower guard portions 413 and 414 are upwardly angularly moved together so that the leading lower guard portion 413 will enter into the safety cover 115.

In accordance with the development of the cutting work, the leading lower guard portion 413 is stopped in abutment with the second stopper 423, whereas the trailing lower guard portion 414 is subsequently continuously rotated against the force of the first coiled tension spring 418 to enter the leading lower guard portion 413.

The cut waste generated during the cutting operation at the waste generating portion 120 of the front portion of the circular saw will flow along an inner wall 115a of the safety cover 115 and will be discharged from a discharge port 120 of the safety cover 115 to a predetermined place. Since the leading edge portion of the lower guard 116 is located remote from the waste generating portion 120 by the second stopper 423, the cut waste will not enter the lower guard 116 in the midway of the flow path. Accordingly, it is possible to effectively avoid the splashing of the waste to the outside.

When the circular saw is released from the pressure from the workpiece A upon the completion of the cutting work, the lower guard 116 is returned from the position shown in FIG. 13 to the position shown in FIG. 10 by the returning force of the second coiled tension spring 422. In this case, the trailing lower guard portion 414 is telescopically discharged from the leading lower guard portion 413 by the returning force of the first coiled tension spring 418 so that it will cover the lower portion of the circular saw blade 113 and will be stationarily held in abutment with the first stopper 421.

Figure 14:
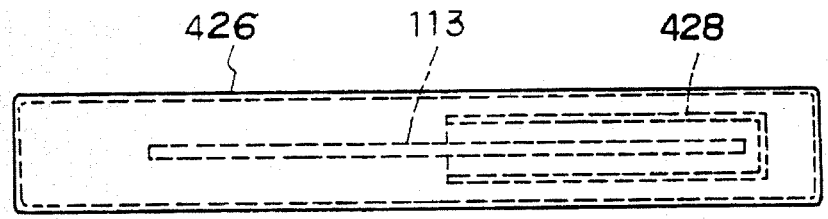
FIG. 14 is a plan view showing another embodiment of the invention.
Figure 15:
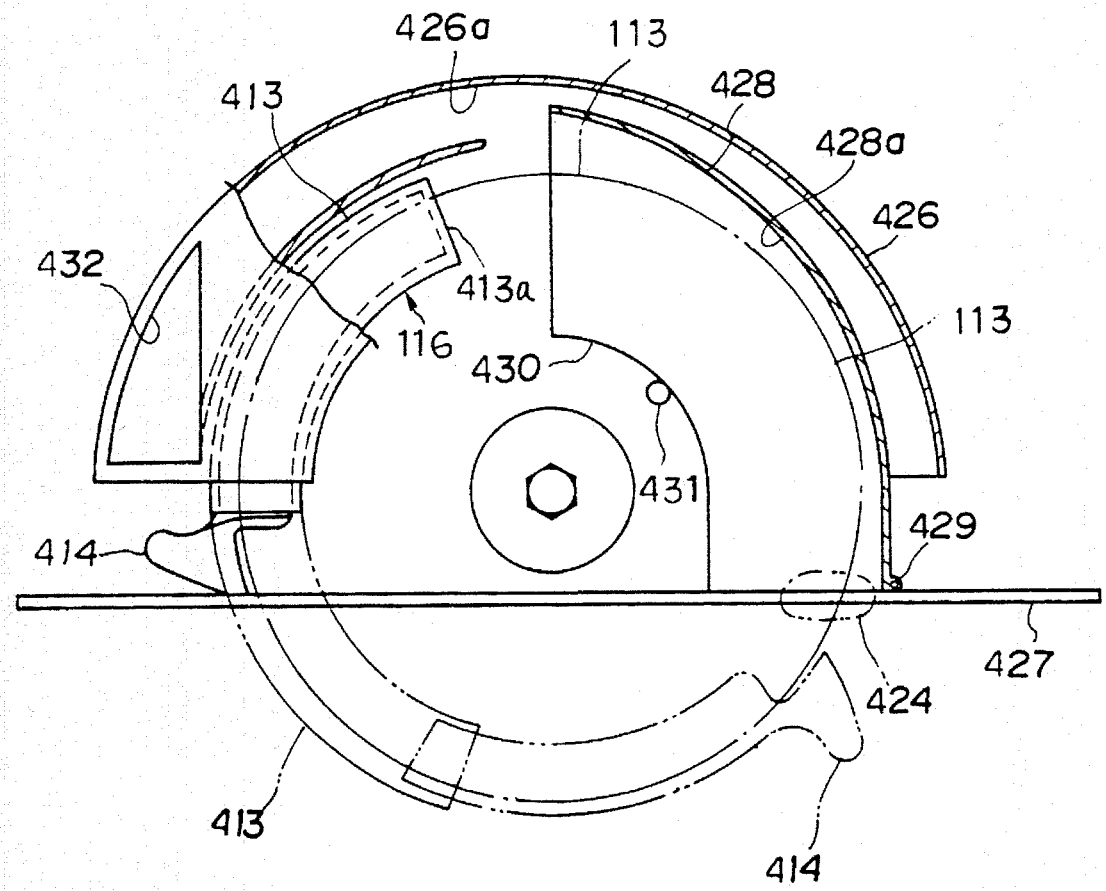
FIG. 15 is a fragmentary side elevational view showing the cover structure shown in FIG. 14.

Still another embodiment of the invention will be described with reference to FIGS. 14 to 16 in which a reference plate 427 which moves in response to adjustment of a cutting depth of the workplace A is provided below a safety cover 426.

In addition to the structure of the foregoing embodiment shown in FIGS. 10 to 13, an auxiliary cover 428 having a U-shaped cross section for covering the front portion of the circular saw blade 115 is disposed between the reference plate 427 and the front portion of the safety cover 426 to be movable together with the reference plate 427. More specifically, the auxiliary cover 428 is connected at its lower portion to the reference plate 427 through a pin 429 that is in parallel to the axial direction of the rotary shaft 410 of the circular saw blade 113. Curved edges around the rotary shaft 410 are provided in the upper portion of the auxiliary cover 428 and are in abutment with a pin 431 implanted in the safety cover 426.

Figure 16:
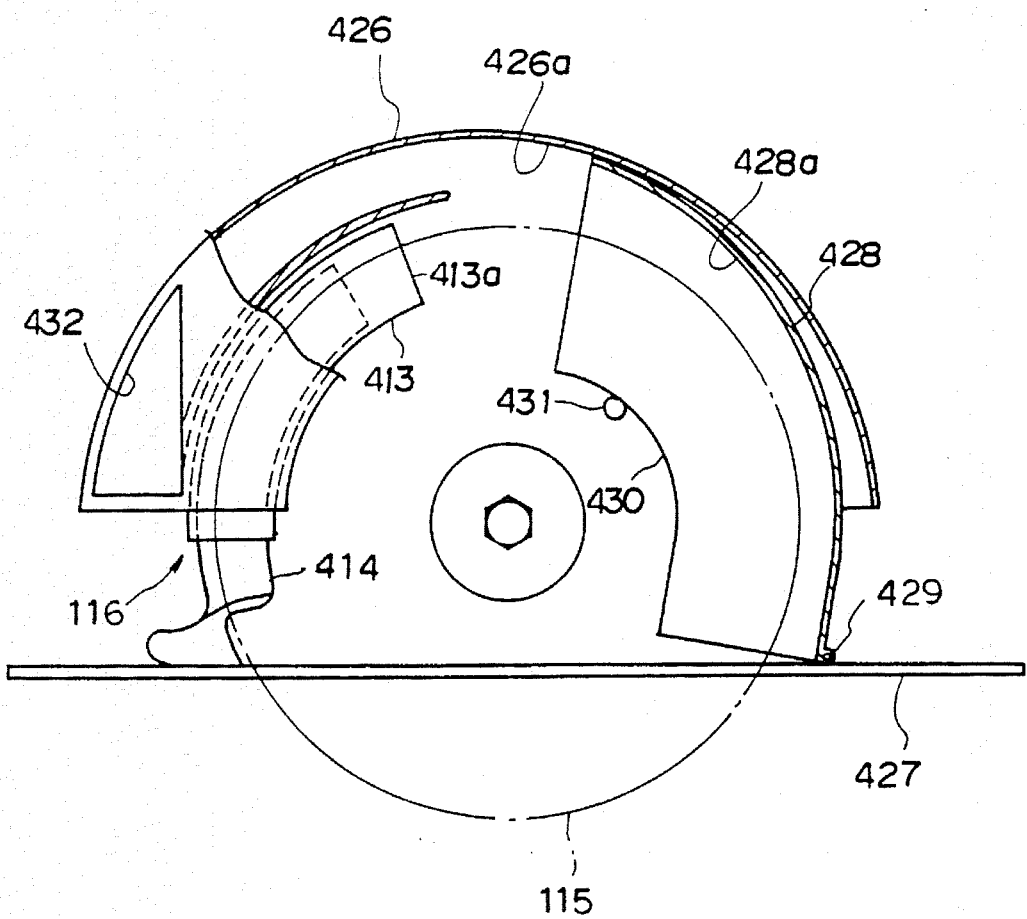
FIG. 16 is a fragmentary side elevational view, similar to FIG. 15, showing a state in which a cutting depth is changed.

With such an arrangement, even if an interval between the circular saw blade 113 and the reference plate 427 is changed as shown in FIG. 16, the auxiliary cover 428 always covers the waste generating portion 424 to thereby prevent the waste from being splashed outside.

The inner wall 428a of the auxiliary cover 428 facing a tip edge of the circular saw blade 113 is formed so that a distance between the inner wall 428a and the tip edge is gradually increased from the lower portion to the upper portion thereof. More specifically, the inner wall 428a is directed upwardly in the tangential direction of the circular saw blade 113 from the reference plate 427 in the vicinity of the circular saw blade 113, separated away from the circular saw blade 113 while depicting a curve and approaches the inner wall 426a of the safety cover 426.

With such an arrangement, the cut waste generated in the waste generating portion 424 will flow from inside to outside of the circular saw 113 in accordance with the rotation of the circular saw blade 113 and will rise along a shape of the auxiliary cover 428. The waste will be discharged outside of the auxiliary cover 428 above the leading edge 413a of the lower guard 116 and will abut against the inner wall 426a along the outer periphery of the safety cover 426. Accordingly, the waste will not enter the lower guard 116 but be directed to the discharge port 432.

The waste collection efficiency regarding this embodiment was measured and the following results were obtained.

| | cover structure | |
|---|---|---|
| cutting depth | prior art | present invention |
| 75mm | 70% | 96%(FIG. 15) |
| 45mm | 65% | 95%(FIG. 16) |

The measurement method therefor was that the workpiece (which was 39 mm thick and 500 mm long) was cut three times by the electric circular saw according to the invention; the waste was collected by a cut waste collecting box mounted on the discharge port 423 of the safety cover 426; and a weight (A) of the cut waste and a weight (B) of the cut waste which had been splashed to the outside were measured by using an electronic scale, respectively.

Figure 17:
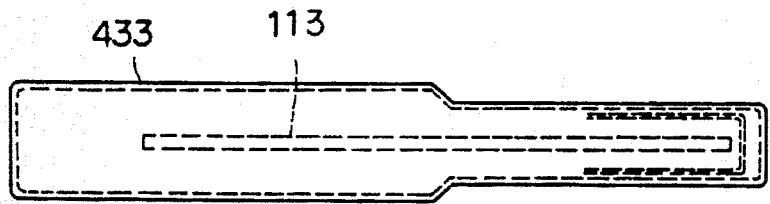
FIG. 17 is a plan view showing still another embodiment of the invention.

The cutting depths of 75 mm and 45 mm corresponded to those shown in FIGS. 16 and 17, respectively. The collecting efficiency was based upon the following relationship as described before:

$$Al (A+B) \times 100$$

Figure 18:
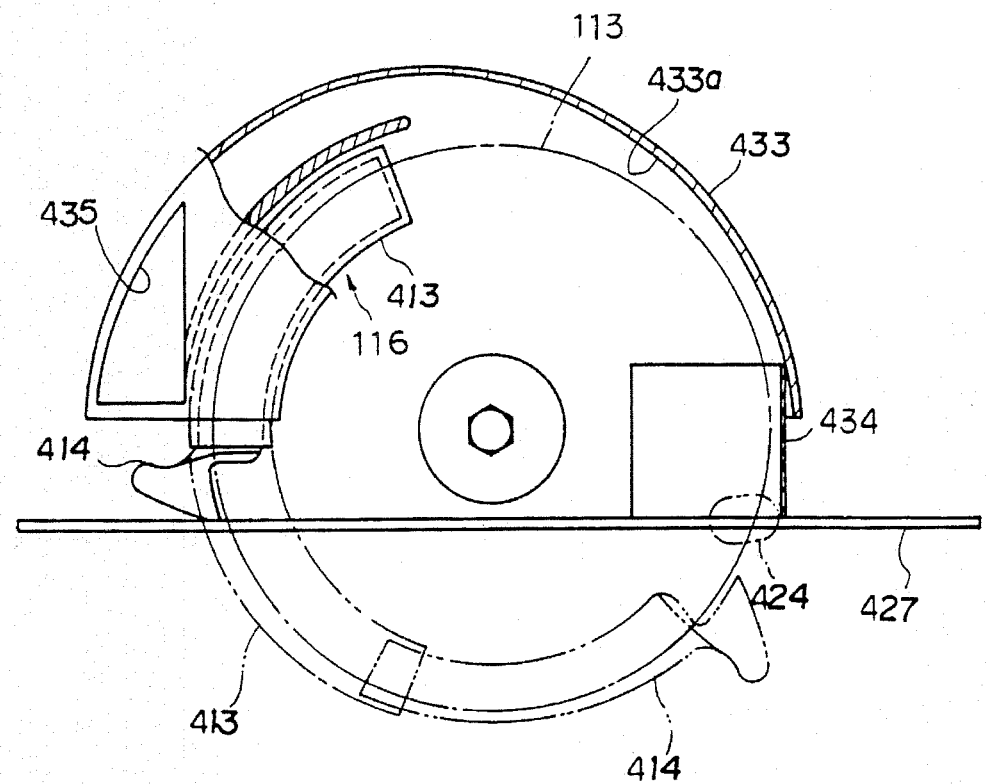
FIG. 18 is a side elevational view showing the cover structure shown in FIG. 17.

Still another embodiment of the invention will now be described with reference to FIGS. 17 to 19 in which the following structure is added to the structure shown in FIGS. 10 to 13. Namely, an auxiliary cover 434 having a U-shaped cross section covering the front portion of the circular saw blade 113 is provided between the reference plate 427 which moves in response to the adjustment of the cutting depth of the workpiece A and the front portion of the safety cover 433 to be movable together with the reference plate 427. In this case, the auxiliary cover 434 is fixed to the reference plate 427.

Figure 19:
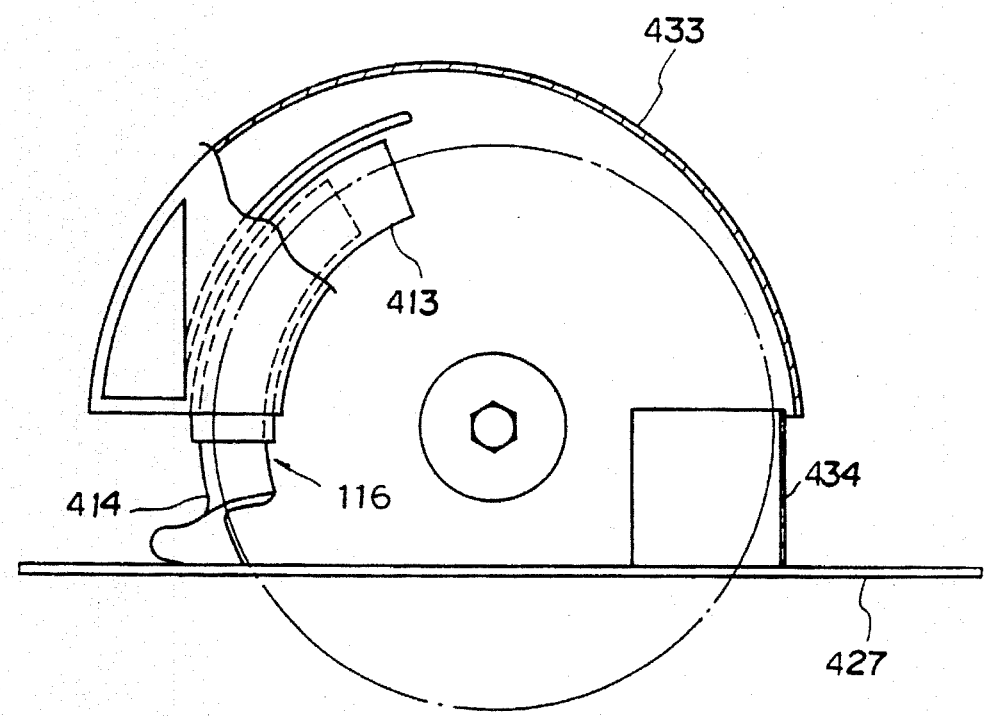
FIG. 19 is a view, similar to FIG. 18, showing the cover structure where the cutting depth is changed.

With such an arrangement, as shown in FIG. 19, even if the interval between the circular saw blade 113 and the reference plate 427 is changed, the auxiliary cover 434 always covers the cut waste generating portion 424 to thereby prevent the waste from being splashed through a space between the reference plate 427 and the front portion of the safety cover 433 to the outside.

The inner wall 433a facing the tip edge of the circular saw blade 113 of the safety cover 433 is formed so that the interval between the inner wall 433a and the front edge of the blade is gradually increased from the front portion to the top portion. Namely, the inner wall 433a is gradually separated from the tip edge of the blade while depicting a curve from the front portion of the circular saw blade 113.

With such an arrangement, the cut waste generated in the cut waste generating portion 424 will flow from inside to outside of the circular saw blade 113 in accordance with the rotation of the circular saw blade 113 and will rise along a shape of the inner wall of the auxiliary cover 434 and the safety cover 433. Thus, the waste will not enter the lower guard 116 but will be discharged from the discharge portion 435 of the safety cover 433 to the outside.

As described above, according to the present invention, it is possible to prevent the waste from entering the lower guard and to lead the waste to the predetermined discharge port without splashing the waste within the safety cover. According to the invention, it is possible to prevent the waste from splashing through a space between the safety cover and the reference plate.

What is claimed is:

1. A cut waste discharging device for a circular saw blade of an electric power circular saw machine, comprising:

a safety cover for covering an upper portion of said circular saw blade;

a lower guard which is angularly movable into said cover in accordance with development of a cutting operation of a work piece with said circular saw;

a front cover body having a substantially U-shaped cross section for covering a waste generating portion at a front portion of said circular saw blade; and a reference plate positionally adjustably formed relative to said safety cover;

wherein said front cover body is provided to be movable up and down relative to said safety cover, said front cover body having, at its lower edge, a skirt portion for covering the waste generating portion, said skirt portion being in contact with said reference plate;

said front cover body having a pair of shield members which are provided, at inner ends of walls, extending along the saw blade, of said front cover body so as to embrace the circular saw blade to thereby prevent the cut waste from splashing inwardly.

2. A cut waste discharging device according to claim 1, wherein said pair of shield members are slanted obliquely toward an inner wall of a front portion of the safety cover so as to direct the cut waste to the inner wall surface of the safety cover, while colliding with the shield members.

3. A cut waste discharging device according to claim 1, further comprising a rectifying plate interposed between said shield members portion and a leading edge position of said lower guard held in a fully received position within said safety cover for directing the cut waste toward between said safety cover and said lower guard.

4. A cut waste discharging device according to claim 1, wherein said skirt portion is made of elastic material in sealing contact with said reference plate.

* * * * *